United States Patent [19]
Woods et al.

[11] 3,727,046
[45] Apr. 10, 1973

[54] VEHICLE TRAVEL SPEED CONTROL AND MONITORING METHOD AND APPARATUS

[76] Inventors: David H. Woods, 1263 Harvest Dr., Monroeville, Pa. 15146; George M. Thorne-Booth, 4614 Sendero Pl., Tarzana, Calif. 91356

[22] Filed: Jan. 4, 1971

[21] Appl. No.: 103,697

[52] U.S. Cl. ................................246/182 C, 180/98
[51] Int. Cl. ...............................................B61l 3/22
[58] Field of Search..................235/92 PB; 324/161, 324/166; 246/182 R, 182 C, 187 R, 187 B; 328/140; 180/98

[56] References Cited

UNITED STATES PATENTS

3,397,309  8/1968  Stone.............................246/182 R
2,803,743  8/1957  Ballerait.........................246/187 B

Primary Examiner—Gerald M. Forlenza
Assistant Examiner—George H. Libman
Attorney—F. H. Henson and R. G. Brodahl

[57] ABSTRACT

For a vehicle traveling along a path between first and second stations in accordance with a predetermined speed-distance profile, a first plurality of control markers are disposed along the path at predetermined intervals, and a second plurality of control markers are also disposed along the path at predetermined intervals relative to the first plurality of markers. The vehicle carries cooperative marker sensing travel control apparatus, including a signal counter and other signal logic elements for sensing any overspeed condition of the vehicle relative to the desired speed distance profile and for sensing the time it takes the vehicle to travel from one control marker to the next control marker. In response to the sensing of an overspeed condition, the vehicle is brought to a substantially fail-safe controlled stop in relation to the comfort and safety of any passengers or cargo.

20 Claims, 14 Drawing Figures

VEHICLE TRAVEL SPEED CONTROL AND MONITORING METHOD AND APPARATUS

SUMMARY OF THE INVENTION

The present vehicle movement control method and apparatus includes an N stage counter which counts periodic input pulses, and which also includes first and second signal providing means for providing at their respective outputs, first and second output signals. The vehicle movement control apparatus operates in a substantially fail-safe manner providing a third signal in response to the first signal means continuously providing the first output signal during the time the counter is operative to count to a predetermined count in proper sequence, and for providing a desired control signal in response to one of the first or third signals being provided.

When the vehicle movement control apparatus is provided as an overspeed detection system on board a vehicle traveling along a path between two stations, the first and second signals means sense first and second pluralities of position control markers, respectively, disposed along the path. The first and second signals are provided, during the times the first and second signal means are not sensing ones of the first and second position control markers, respectively. A speed monitoring signal is provided in response to the control signal being continuously provided, and the vehicle is brought to a stop in response to the speed monitoring signal not being provided.

BACKGROUND OF THE INVENTION

In a system where a rubber tired vehicle travels along a path between two stations, and at least one of those stations includes an overshoot area or a physical barrier, such as a brick wall, at the end of the vehicle travel path at that station, there must be a vehicle control for detecting an overspeed condition of the vehicle as it travels along the travel path, so the vehicle is stopped prior to its reaching the barrier.

In a known prior art vehicle travel control system, control markers, arranged like a picket fence are placed along the travel path. The vehicle determines its travel position along the path by sensing the control marker pickets of the fense as the vehicle passes along the path. The vehicle speed at a given time is derived from the vehicle's propulsion system. The sensed position of the vehicle and its speed, as indicated by the vehicle propulsion system, and is compared with a known speed-distance profile stored in the travel control system on board the vehicle. The major disadvantage of this prior art system, is that the travel control system is not fail-safe in that the failure modes of the various components are not known. Therefore, a component failure in the travel control system may result in an actual overspeed condition of the vehicle not being sensed whereby the vehicle may strike some physical barrier located along its travel path prior to the vehicle receiving a desired and normal braking command signal.

The cost of making a fail-safe travel control system with known failure modes is relatively expensive and is, therefore, prohibitive from a cost standpoint.

The teachings of the present invention provide a relatively inexpensive and fail-safe control signal logic system which detects any actual overspeed condition of the vehicle, and effects a vehicle travel control relative to a predetermined and desired speed-distance profile for the vehicle.

DESCRIPTION OF THE DRAWINGS

FIG. 5b is a waveform relationship illustration helpful in the understanding of FIG. 5a.

DESCRIPTION OF THE PREFERRED EMBODIMENT

Figure 1:
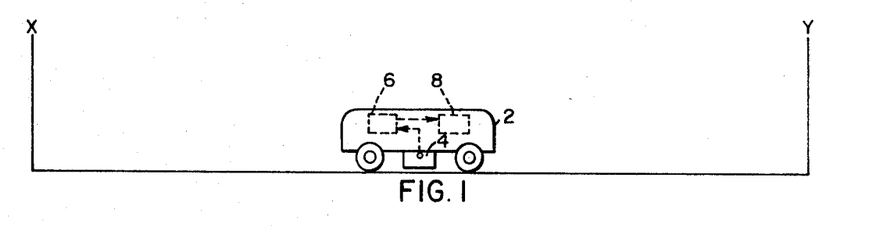
FIG. 1 is a schematic diagram of a vehicle which operates according to the teachings of the present invention.

In a vehicle travel control method and system where a vehicle travels along a path between two stations, and at one or both of the stations there is a specified overshoot area, such as a physical barrier before which the vehicle must stop, there must be a monitoring and control of the travel speed of the vehicle along its path. The monitoring is performed to insure that the vehicle does not travel at higher than a given velocity at a given location or point along the path of travel. This insures that the vehicle is able to stop, at a desired comfort and safety level for any passengers or cargo carried by the vehicle, prior to reaching the physical barrier. In reference to FIG. 1 there is illustrated a vehicle 2 which travels between two stations or physical barriers as illustrated by the vertical lines X and Y at the leftmost and rightmost ends of the drawing, respectively. The vehicle 2 carries a sensing device 4 which may be mounted for example on the underside of the vehicle for sensing position control markers placed along the vehicles path of travel. The sensing device 4 transmits signals to an on-board monitoring and logic device 6 which acts upon the signals sensed by the signal sensing device 4 to determine whether or not the vehicle is operating at a velocity which is an acceptable velocity with respect to the vehicles particular position along the path of travel. The signal monitoring and logic device 6 controls a braking control mechanism 8, which stops the vehicle 2 in the event the braking control device 8 no longer receives a speed monitoring signal output from the signal monitoring and logic device 6.

In a vehicle control system wherein a vehicle has its own on-board power unit, monitoring and control unit, and braking unit, the vehicle is usually constrained to travel at a speed calculated with respect to a predetermined typical speed-distance profile. In reference to FIG. 2 there is illustrated a typical speed-distance profile acceptable for the vehicle 2 as it travels between the stations X and Y. The ordinant of the profile indicates the distance traveled whereas the abcissa of the profile indicates the speed at which the vehicle may travel at a given position along the path. It may be seen that close to a particular station the vehicle is constrained to travel at a relatively slow speed whereas essentially midway between the stations X and Y the vehicle is allowed to travel at a relatively high rate of speed. Since the distance a vehicle travels equals the velocity of the vehicle times the time it takes the vehicle to travel the distance, a constant time reference may be derived as the velocity of the vehicle changes relative to the distance the vehicle travels. If in the vehicle control system illustrated, the time it takes the vehicle to travel between any two given points along the path of travel is shown to be a constant then as the velocity of the vehicle increases the distance between the two given points along the path of travel must also increase to keep the reference time constant. Therefore it may be seen in reference to FIG. 2 that if position control markers are placed along the path of travel between the stations X and Y the markers must be placed relatively close to one another close to the station as the velocity of the vehicle is less when the vehicle is close to the station. Conversely as the vehicle travels farther from the station, for example approximately halfway between the stations X and Y, the velocity of the vehicle increases and accordingly the distance between markers must also be increased proportionate to the speed of the vehicle. It is seen in each instance that the time it takes the vehicle to travel between any two given markers is substantially as constant as the markers are spaced farther apart as the vehicle speed increases.

Figure 3:
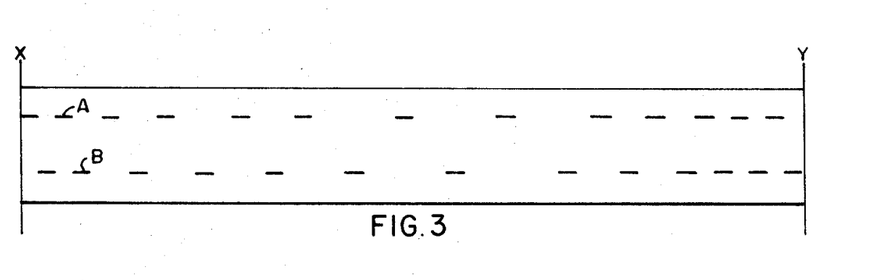
FIG. 3 is a schematic diagram of a vehicle roadway with markers disposed along the roadway in accordance with the speed-distance profile.

In reference to FIG. 3 there is illustrated a view of the roadway between the stations X and Y, which view is a downward on top view of the roadway. On the upper half of the roadway as illustrated in FIG. 3, there are shown a plurality of position control markers A, and it is seen that close to the stations X and Y the markers A are relatively close to one another whereas the farther one gets from the stations the X and Y the markers are at a greater distance from one another. On the lower half of the roadway there is illustrated a plurality of position control markers B, which are spaced essentially at the same intervals between one another as are the markers A however it may be seen that the markers B are staggered with respect to the markers A, that is as a vehicle travels from left to right from station X to station Y it first passes a marker A, then a marker B, then a marker A, and so on along the path of travel. That is, the vehicle senses alternate one of the markers as it travels along the roadway. The markers A and B are attached to the bed of the roadway and extend essentially at an angle which is perpendicular to the bed of the roadway such that they may be sensed by the sensing mechanism 4 which is attached to the underside of the vehicle 2.

Figure 4:
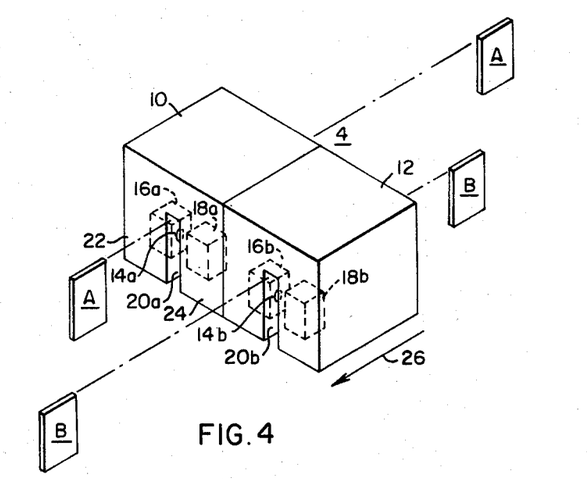
FIG. 4 is a schematic diagram of a marker sensing system useful in the practice of the present invention.

In reference to FIG. 4 there is illustrated a typical signal device which may be used as the signal sensing mechanism 4. It is comprised of a first signal means 10 and a second signal means 12 which are identical in construction. The signal sensing mechanism 4 may be mounted on the underside of the vehicle 2 by any well known means such as bolting or fastening to attaching members. The first signal means 10 has a signal source 16a which may transmit radiant energy such as infrared energy which is modulated at an A.C. rate, for example 155 kilohertz, or alternatively it may be a source of magnetic energy which transmits magnetic energy or flux which is modulated at a 155 kilohertz rate. The first signal means 10 also includes a signal sensor 18a which is responsive to the energy transmitted across the aperture or gap 20a which extends midway between the legs 22 and 24 of the first signal means 10. If the signal means 10 transmits radiant energy, a window 14a is provided through which the radiant energy passes. The second signal means 12 contains like signal sources and signal sensing mechanisms as does the first signal means 10 and these mechanisms are given the same numeral identification with the letter b appended. The signal sources 16a and 16b continuously transmit signals across the apertures or gaps 20a and 20b and these signals are sensed or detected by the signal sensors 18a and 18b respectively, until these signals are interrupted by some external means. The external means for interrupting these signals are the position control markers A and B which lie essentially perpendicular to the roadway and which were also shown in FIG. 3. Two such position control markers A and two such position control markers B are illustrated in FIG. 4. If the vehicle is traveling in the direction as illustrated by the arrow 26 then the signal sensing mechanism also travels in that direction. The marker A is placed in the roadway in such a manner that as the signal sensing mechanism approaches it, the marker A passes through the aperture 20a and interrupts the signal transmission from the source 16a to the signal sensor 18a. In the case of radiant energy, such as infrared energy, the marker A blocks the flow of the energy across the gap such that the signal sensor 18a can no longer sense the signal. In the case where the signal source 16a transmits magnetic energy the marker A detunes the circuit coupling between the signal source 16a and 18a such that the signal sensor A may no longer transmit an output signal of a meaningful level. The marker B in like fashion interrupts the passage of the signals transmitted from the signal source 16b in the second signal means 12 to the signal sensor 18b, as the sensing mechanism 4 passes over the marker B and the marker B passes through the aperture 20b blocking the transmission of the energy.

Figure 5A:
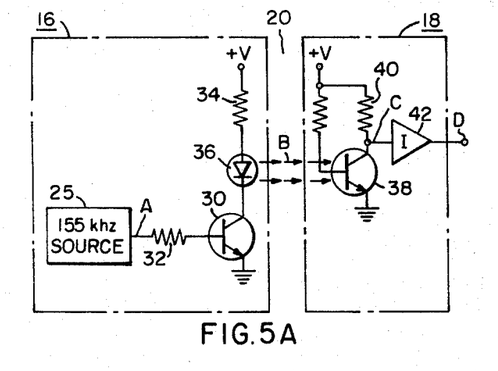
FIG. 5a is a schematic diagram of signal sensing devices which may be used in the marker sensing system of the present invention.
Figure 5B:
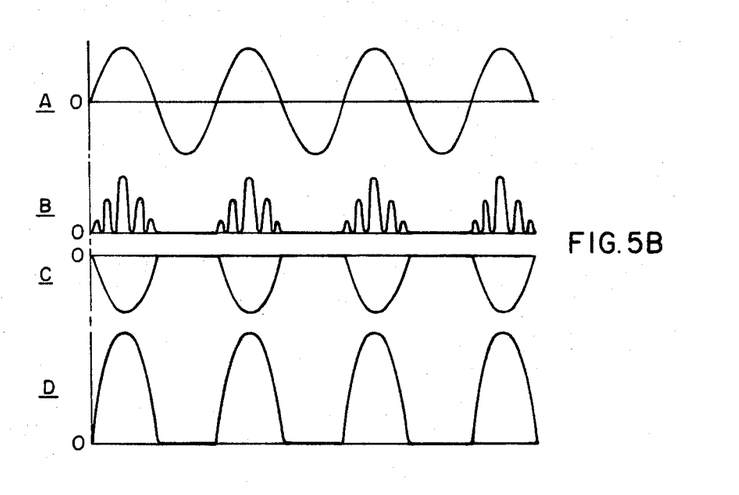

In reference to FIG. 5A there is shown an embodiment in which the signal source 16 (as shown in FIG. 4) comprises a radiant energy transmitting device such as an infrared transmitter and the signal sensor 18 (as shown in FIG. 4) comprises a radiant energy receiving device. A source of radio frequency signals such as the 155 KHZ source 25 couples 155 KHZ signals (as shown by wave A FIG. 5B) to the base electrode of a transistor 30 through a resistor 32. The positive portions of the 155 KHZ signal make the transistor conductive drawing current from the voltage source + V through the resistor 34, the infrared light emitting diode 36 and through the collector and emitter electrodes of the transistor 30 to ground. In response to the current flow through the infrared light emitting diode 36 infrared energy modulated at a 155 kilohertz rate is emitted from the light emitting diode 36 (as shown by wave shape B FIG. 5B). The infrared energy transmitted by the infrared light emitting diode 36 is detected by a photodiode 38 in the signal sensor 18. The detection of the infrared energy at the base electrode of the phototransistor 38 makes the transistor 38 conductive such that current flows from the positive voltage source + V through the load resistor 40, and through the collector and emitter electrodes of the transistor 38 to ground producing the wave shape as shown at C in FIG. 5B. If a wave shape with positive going pulses is desired the collector electrode of transistor 38 may be coupled to the input terminal of an inverting amplifier 42 and an amplified and inverted wave shape as shown as wave D FIG. 5B is produced at the output terminal D. The output terminal D is then connnected to the device 6 in the vehicle 2 as will be explained subsequently.

Figure 6:
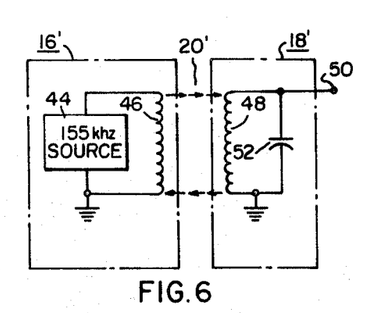
FIG. 6 is a schematic diagram of another signal sensing devices which may be used in the marker sensing system of the present invention.
Figure 8:
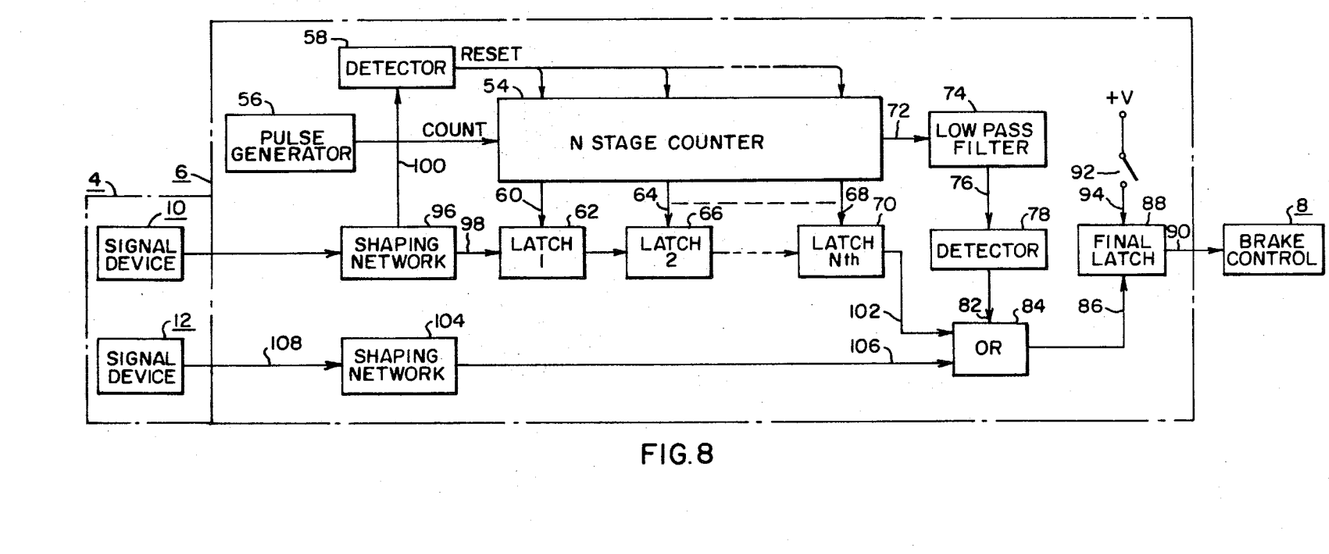
FIG. 8 is a system block diagram embodying the teachings of the present invention.

As was stated earlier the signal source 16 and the signal sensor 18 may be magnetic devices rather than radiant energy devices, as was explained in conjunction with FIG. 5. In reference to FIG. 6 there is shown a magnetic signal source 16' and a magnetic signal sensor 18'. A 155 kilohertz source 44 which is connected across a coil 46, forms the magnetic signal source 16'. The flow of current through the coil 46 at a 150 KHZ rate causes lines of flux to cross the aperture or gap 20' causing current to flow through the coil 48 of the signal sensor 18' producing a 155 kilohertz wave at the terminal 50 coupling it to a shaping network 52 (as shown in FIG. 8) which is part of the device 6 in the vehicle 2 which is explained subsequently. The capacitor 52 as used in conjunction with the coil 48 forms a tuned circuit such that when a metal plate such as one of the markers A or B is passed between the coils 46 and 48 the lines of flux passing from the coil 46 to the coil 48 are interrupted in such a fashion as to detune the tuned circuit in the sensor 18' such that essentially no signal is produced at the terminal 50 or in other words the signal sensor 18 no longer senses a meaningful signal transmission from the signal source 16.

Figure 2:
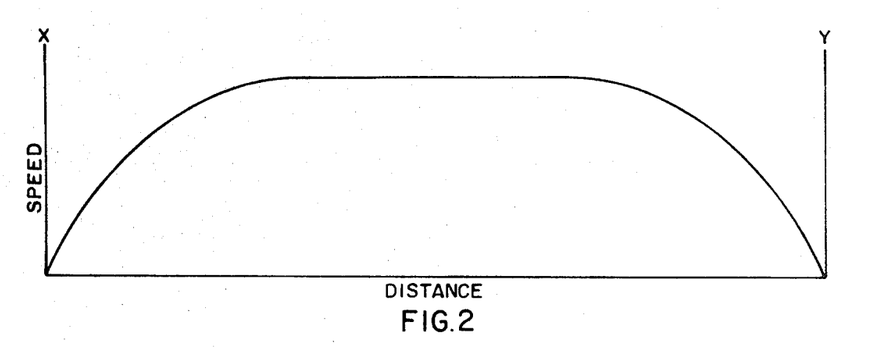
FIG. 2 is a typical speed-distance profile for vehicles which operate according to the teachings of the present invention.

As was stated earlier the time it takes the vehicle to travel from a marker A to a marker B is a constant time since time equals the distance divided by the velocity, and as the velocity of the vehicle increases according to the speed profile illustrated in FIG. 2 the distance between plates A and B correspondingly increases. In reference to FIG. 7 there is illustrated a graph which illustrates in a time frame of reference the time, which as was mentioned earlier as a constant time, which it takes the vehicle to travel between the sensing of a plate A and subsequently the sensing of a plate B. The time a plate A is sensed is graphically depicted by the bar A and the time a marker B is sensed is graphically depicted by the bar B. The bar C graphically depicts the minimum time interval which may accrue between the sensing of a marker A and the subsequent sensing of a marker B. This time interval is depicted graphically as the time interval $t$. If a marker B is sensed prior to the time C, the vehicle is considered to be traveling at too high a speed for that particular position along the path of travel. Assume that a vehicle is traveling at a velocity greater than the predetermined safe operating velocity for that particular section of the roadway. In effect the marker B is sensed at a time earlier than it would be sensed if the vehicle had been traveling within the safe speed. This is graphically illustrated by the dotted bar B' since the B marker is now sensed prior to the completion of the minimum safe time interval $t$ being completed. This is an unsafe condition, and the vehicle should be brought to a stop. If the device which computes the time interval $t$ for each time interval between sensing of markers fails in the direction that it counts the time interval too slowly what essentially happens is that the time interval $t$ which is the safe time interval increases to a time interval $t'$ and essentially moves the bar C to a position depicted by the dotted bar C'. Therefore the vehicle appears to be traveling at too great a velocity since the time the marker B is sensed, which is depicted graphically by the bar B, occurs prior to the completion of the generation of the time interval $t'$ which is shown at C'. This also is an unsafe condition, and the vehicle should be brought to a stop. The present system invention utilizes the principles graphically depicted on the graph to determine when the vehicle is traveling at a non-safe velocity and when so determining applies the brakes to the vehicle. The vehicle is determined to be operating at a non-safe velocity whenever a marker B is senses at the time B', which occurs prior to the time C, or when a marker B is sensed prior to the time C' which is a non-safe condition since the timing device is counting at too slow a rate.

In reference to FIG. 8 there is illustrated a detailed diagram of the monitoring and logic device 6 and its connection to the brake control device 8 and the signal sensing device 4 which comprises the signal devices 10 and 12. As long as the brake control device 8 senses a speed monitoring signal output from the logic device 6 the vehicle 2 is allowed to continue along the path of travel. Conversely if the speed monitoring signal from the logic device 6 to the brake control unit 8 is interrupted the brakes are automatically applied to the vehicle and the vehicle is stopped. The logic unit 6 is then unable to provide a speed monitoring signal to the brake control unit 8 until the logic unit 6 is made to function properly or reset to an operational mode by a remote control signal or a manual control signal as is explained subsequently.

The control unit 6 includes an N stage counter 54 which receives count pulses from a pulse generator 56 and receives a reset pulse from a detector 58. If the counter 54 is an upcounter the one output terminal of the first stage of the counter is connected to a control terminal 60 of a latch 62, which is called latch 1; the one output terminal of the second flip-flop is connected to a control terminal 64 of a latch 66, which is termed latch No. 2; and so forth down to the Nth stage of the counter which has its one output terminal connected to a control terminal 68 of a latch 70, which is termed latch Nth. If the counter 54 is a down counter the zero output terminals of the respective flip-flops would be connected to the control terminals of the latches or alternatively the one output terminals of the individual flip-flops could be connected through respective inverters to the control terminals of the latches. The one output terminal of the Nth flip-flop is also connected via a line 72 to the input of a low pass filter 74, and the output of the filter 74 is connected via a line 76 to the input of a detector 78, which in turn has its output connected via a line 80 to the power terminal 82 of the OR gate 84 which in turn has its output connected via a line 86 to the input of a final latch 88 which is of the same construction as the latches 1 through Nth which are connected to the N stage counter. The final latch 88 has its output connected via a line 90 to the input of the brake control device 8. A source of operating potential + V is connected via a switch 92 to the control terminal 94 of the final latch 88. The signal device 10 has its output connected to the input of a shaping network 96 which has a first output connected to the input of the first latch 62 via a line 98 and which has its second output connected to the input of the detector 58 via a line 100. As is readily seen from the drawing the output of the latch 62 is connected to the input of the latch 66 and so onto the Nth latch 70 which has its output connected to a first input of the OR gate 84 via a line 102. The second input of the OR gate 84 is connected to the output of a shaping network 104 via a line 106 and the input of the shaping network 104 is connected to the output of the signal device 12 via a line 108. Prior to the description of the operation of the logic device 6 a typical latch unit as well as the operation of other devices in the logic device 6 will be described so that the operation of the logic device 6 may be more readily understood.

Figure 9:
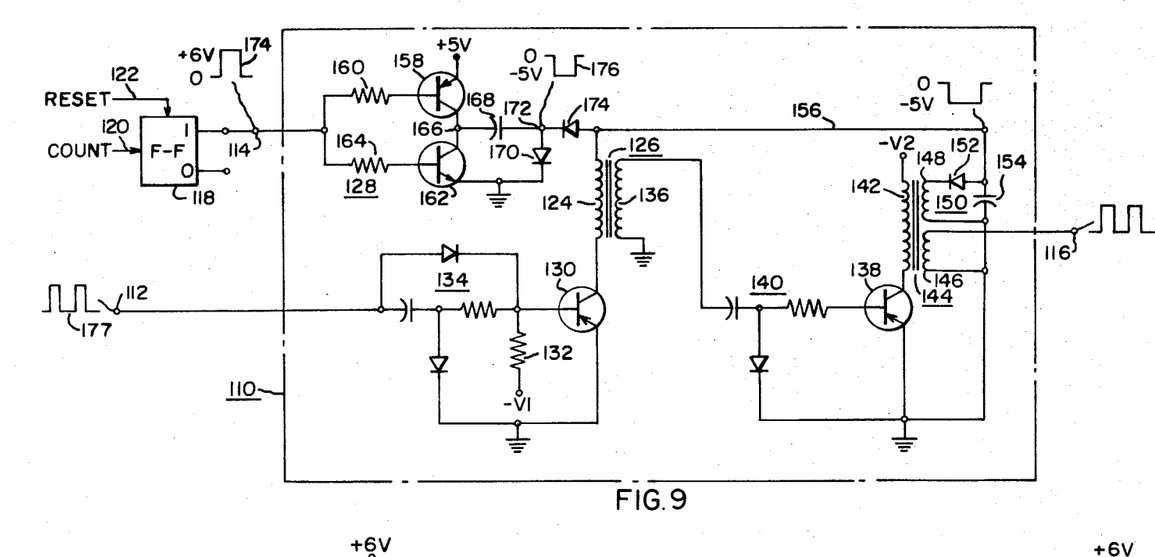
FIG. 9 is a schematic diagram of the latch circuits which are illustrated in block form in FIG. 8.

In reference to FIG. 9 there is shown a latch unit 110 which may be used in the practice of the present invention. The latch 110 has a signal input terminal 112, a control terminal 114 and a signal output terminal 116. The signal input terminal 112 receives periodic input pulses substantially square wave in nature. In reference to latch 1 in FIG. 8, the signal input terminal 112 is connected to the line 98, the control terminal 114 is connected to the line 60, and the signal output terminal 116 is connected to the signal input terminal of the latch 2. Returning now to FIG. 9 the control terminal 114 is shown as connected to the one output terminal of a flip-flop 118. It is understood that the one output terminal of the flip-flop is also connected to the input of the following stage in the counter. The flip-flop 118 is a standard flip-flop which changes state in response to periodic input pulses as applied to a line 120, which is shown as a count line, and is reset by a pulse applied to a line 122 which is shown as a reset line. The signal from the one output terminal of the flip-flop 118 is applied to the primary coil 124 of a transformer 126 via a level shifting network 128. The other side of the primary coil 124 is connected to the collector electrode of a transistor 130, the emitter electrode of which is connected to circuit ground. The base electrode of the transistor 130 is connected to a source of operating potential −V1 through a resistor 132, and to the signal input terminal 112 via a level shifting network 134. The secondary coil 136 of the transformer 126 has one side connected to circuit ground and the other side is connected to the base electrode of a transistor 138 via a network 140. The collector electrode of the transistor 138 is connected to a negative source of operating potential −V2 through the primary winding 142 of a transformer 144. The transformer 144 has two secondary windings the first winding of which 146 has one side connected to circuit ground and the other side connected to the signal output terminal 116 of the latch 110. The second secondary winding 148 is connected to a detector 150 which is comprised of a diode 152 and a capacitor 154. The common connection between the diode 152 and the capacitor 154 is connected via a line 156 to the primary winding 124 of the transformer 126.

Assume initially that the flip-flop 118 is in the binary zero state which is a zero volt level at the one output terminal, and therefore zero volts is applied to the control terminal 114 of the latch 110. The zero volt signal is applied to the base electrode of a transistor 158 through a resistor 160 and to the base electrode of a transistor 162 through a resistor 164. The transistor 162 is held non-conductive since its base and emitter electrodes are essentially at the same level, namely zero volts. The transistor 158 is made conductive by the zero volt potential on its base electrode and in response thereto the five volt signal at the emitter electrode is essentially reproduced at the terminal 166. The side of the capacitor 168 connected to terminal 166 is therefore charged essentially to a +5 volt level and the initial positive current flowing through the capacitor 168 makes the diode 170 conductive whereby the terminal 172 is essentially clamped to a zero volt potential. The diode 174 therefore is nonconductive and no voltage is applied to the collector electrode of the transistor 130 through the primary winding 124 of the transistor 126. Therefore even though input pulses are applied to the terminal 112 of the latch 110 the transistor 130 remains non-conductive, since there is no operating potential applied to its collector electrode. There is therefore no signal developed across the secondary winding 136 of the transformer 126 and in turn there is no signal applied to the base electrode of the transistor 138. The transistor 138 has operating potential −V₂ applied to its collector electrode but it remains non-conductive since there is no input signal applied to its base electrode and, therefore no output signal is developed across the secondary winding 146 and in turn there is no output signal developed at the signal output terminal 116 of the latch. Accordingly the second secondary winding 148 develops no output signal and the detector 150 detects no signal and therefore couples no signal by way of the line 156 to the collector electrode of the transistor 130 through the primary winding 124.

Consider now that the flip-flop 118 switches to the binary one state in response to a count pulse applied to its input via the line 120. The one output terminal of the flip-flop therefore switches to the binary one state which for example is a +6 volt level which is illustrated by the wave shape 174. The 6 volt signal is applied via the resistors 160 and 164 to the base electrodes of the transistors 158 and 162 respectively. Transistor 158 is now made non-conductive since its base electrode is more positive than its emitter electrode and transistor 162 becomes conductive since its base electrode is more positive than its emitter electrode. The terminal 166 therefore is essentially switched to zero volts or ground potential and the terminal 172 switches to a −5 volt level which is illustrated by the wave 176. The negative 5 volt signal makes the diode 174 conductive and the negative potential is applied to the collector electrode of the transistor 130 as operating potential through the primary winding 124 of transformer 126. Assume periodic input pulses as illustrated by the signal 177 are applied to the input terminal 112 at this time. These signals are applied to the base electrode of transistor 130 through the level shifting network 134 and the transistor 130 becomes conductive, and in response thereto a square wave is essentially produced across the secondary winding 136 of the transformer 126 and is coupled to the base electrode of the transistor 138 via the network 140 making transistor 138 conductive. The square wave is then essentially produced across the first secondary winding 146 and appears at the signal output terminal 116 of the latch 110. The square wave signal is also produced across the secondary winding 148 and the capacitor 154 charges to a negative potential and does not discharge as long as the square wave is applied to the detector 150. The negative signal which appears across the capacitor 154 is applied to the collector electrode of the transistor 130 by way of line 156 to serve as operating potential for the transistor, and as long as this negative potential is applied to the collector electrode the square wave applied to the input terminal 112 is produced at the output terminal 116. This is so even if the flip-flop 118 subsequently returns to the binary zero state as the input signal 177 applied to the terminal 112 serves to regenerate operating potential for transistor 130 by way of the feed-back network consisting of the detector 150 which applies the negative potential via the line 156 to the collector of the transistor 130. It is seen therefore that the flip-flop 118 needs to remain in the binary one state only for a time duration long enough for the capacitor 154 to charge to a negative potential sufficient to make the transistor 130 conductive. Assume subsequently that the flip-flop 118 switches to the binary zero state and the application of the square wave 177 to the input terminal 112 is interrupted. The negative potential −V1 which is applied to the base electrode of the transistor 130 via the resistor 132 is sufficient to keep the transistor 130 in a state of low conduction however no output signal is produced across the secondary winding 136 due to the normal transformer action. The capacitor 154 then discharges through the conducting transistor 130 removing the operating potential. The latch therefore does not produce an output signal at the terminal 116 when a square wave 176 is again applied to the input terminal 112 unless the flip-flop is first once again set to the binary one state.

In summary, it is seen that if a periodic square wave is applied to the input terminal 112 of the latch 110 and during the time this square wave is applied to the terminal 112 the flip-flop 118 is set to the binary one state applying a binary one signal to the control terminal 114 a square wave signal is produced at the output terminal 116 of the latch and operating potential is fed from the detector 150 back to the transistor 130 holding transistor 130 conductive as long as input pulses are applied to terminal 112, irrespective of the state of flip-flop 118. If the input pulses 117 are then interrupted, the feedback path from detector 150 no longer provides operating potential and the latch does not provide an output signal at terminal 116 again until input pulses are applied to terminal 112 concurrent with flip-flop 118 being in the binary one state.

Figure 7:
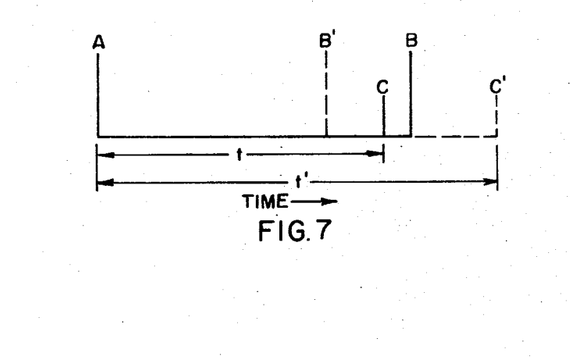
FIG. 7 is a graphical time relationship illustration helpful in the understanding of the present invention.
Figure 10:
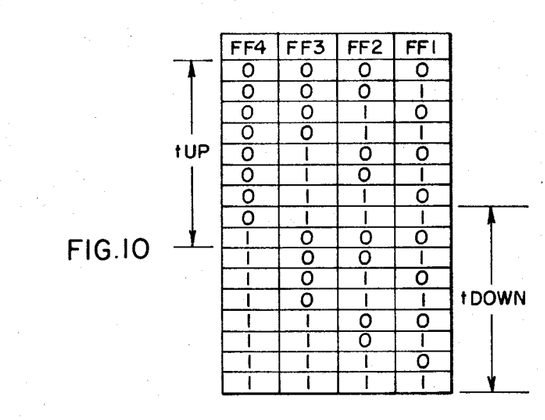
FIG. 10 is a truth table for the N-stage counter illustrated in FIG. 8.

In 8. to FIG. 10 there is illustrated a truth table for a four stage counter which counter may be used as the N stage counter 54 in FIG. *. By way of example only, consider that the N stage counter is in fact a counter made up of four flip-flops. The reference time $t$ for the system is the time it takes for the counter to count to a predetermined count such as by counting $2^{n-1}$ input pulses. Therefore if the counter is an upcounter the time $t$ which is illustrated as the time $t$ up is the time it takes the counter to count from a count of zero up to a count of $2^{n-1}$ which is the time when the flip-flop 4 switches to the binary one state. Conversely if the counter is a down counter is the time it takes the counter to count down from a count of $2^{2-1}$ to a count of $2^{(n-1)}-1$, which is the time the flip-flop 4 switches to the binary zero state. As was explained before it is seen that in either case the counter counts $2^{n-1}$ input pulses to generate the reference time $t$, which is illustrated in the graph of FIG. 7. The total count time of the counter is not utilized to generate the reference time $t$ as the setting of the Nth flip-flop in this case flip-flop 4 to the binary one state makes the latch Nth, in this case latch 4 operational, as a binary one signal is applied to its control terminal.

Figure 11:
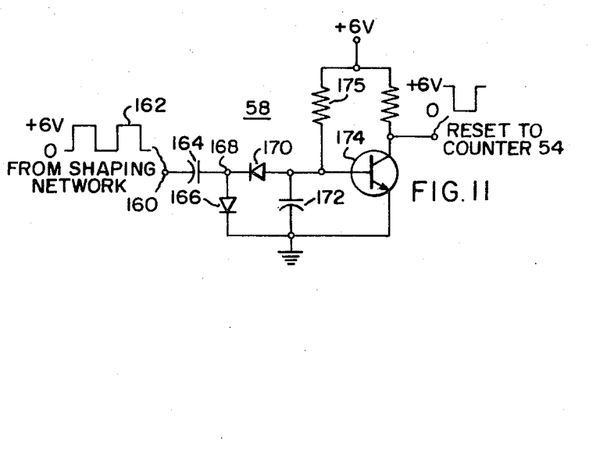
FIG. 11 is a schematic diagram of a detector illustrated in FIG. 8.

In reference to FIG. 11 there is shown a detector circuit which may be one of many used as the detector 58 shown in FIG. 8, which detector, applies a reset pulse to the N stage counter, when the signal device 10 senses an A marker as is to be explained. Essentially square wave type pulses are applied from the shaping network 96 of FIG. 8 to the input terminal 160 of the detector 58 as shown in FIG. 11. The square wave which is illustrated as the signal 162 travels between a level of +6 volts and zero volts, and as the signal goes from a zero volt to a +6 volt level current flows through the capacitor 164 and through the diode 166 clamping circuit point 168 essentially at ground potential. As the input signal 162 then travels from the +6 to zero volt level the charge on the capacitor 164 switches such that a −6 volt level is produced at the circuit point 168 and the diode 170 becomes conductive and the capacitor 172 charges, drawing current from ground through the diode 170, and the diode 166 back to circuit ground. The base of the transistor 174 is held at essentially a negative 6 volt potential due to the charge on a capacitor 172. The resistor 175 and the capacitor 172 have a time constant which is much greater in duration than the repetition rate of the input signal 162, therefore as long as the signal 162 is applied to the input terminal 160 the capacitor 172 does not have sufficient time to discharge and the negative potential applied to the base electrode of the transistor 174 keeps the transistor 174 non-conductive and the output terminal 176 of the detector is held essentially at a +6 volt level. When the input signal 162 is interrupted the capacitor 172 then has sufficient time to discharge through the resistor 175 through the power supply back to ground and the base electrode of the transistor 174 then reaches a positive level of essentially +6 volts which is sufficient for the transistor 174 to become conductive and an output pulse of essentially zero volts is produced at the output terminal of the detector and this zero volt pulse resets the N stage counter. Therefore it is seen that a reset pulse is generated by the detector 58 only when there is no input signal applied to the input terminal 160 of the network, which happens when signal device 10 senses an A marker.

Figure 12:
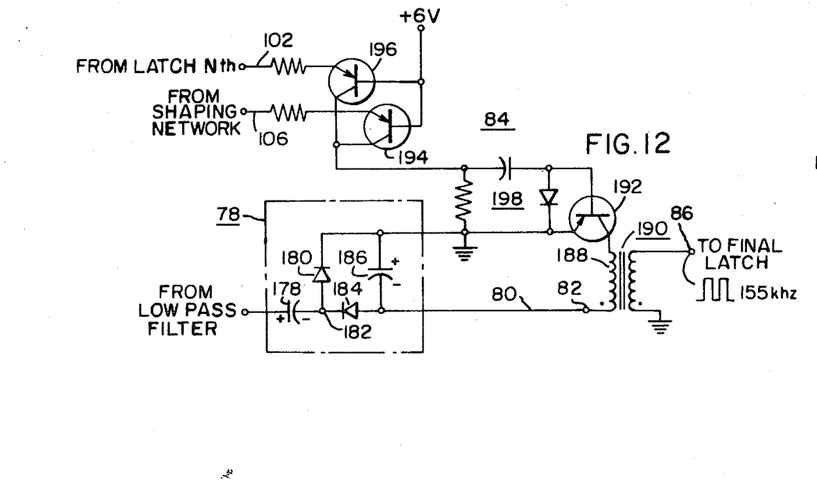
FIG. 12 is a schematic diagram of a detector and OR gate illustrated in FIG. 8.

In reference to FIG. 12 there is illustrated the detector 78 and the OR gate 84 which are shown as part of the logic unit 6 in FIG. 8. The detector 78 performs the function as was explained earlier of applying operating potential to the OR gate 84 via the line 80. The detector 78 receives a sinusoidal wave from the low pass filter 74 (as shown in FIG. 8). The low pass filter 78 provides an output signal only so long as the N stage counter is counting at a predetermined rate. If the counter counts at a higher rate, the low pass filter 74 no longer provides an output signal. During the positive cycles of the sinusoidal wave the diode 180 becomes conductive and the circuit point 182 is essentially at a zero volt or ground potential level. When the negative portion of the input signal is applied to the input terminal of the detector the circuit point 182 is switched to a negative potential and the diode 184 becomes conductive and the capacitor 186 charges from circuit ground through the diode 184 and the diode 180 in a plus to negative direction as shown on the drawing. This negative charge on the one plate of the capacitor is applied via the line 80 through the primary 188 of a transformer 190 to the collector electrode of a transistor 192 maintaining operating potential on the transistor. The capacitor 186 remains charged and therefore maintains operating potential for the transistor 192 so long as the input signal is received from the low pass filter. If the low pass filter does not apply an input signal to the detector 78 the capacitor 186 discharges and there is no longer operating potential for the transistor 192, and the transistor 192 therefore may not become conductive.

Consider now the operation of the OR gate 84 as the transistor 192 is presumed to have operating potential applied to it from the detector 78. The line 102 receives the input signals from the latch Nth, 70 (as shown in FIG. 8) and the line 106 of the OR gate 84 receives the signal from the shaping network 104 (as shown in FIG. 8). The base electrodes of transistors 194 and 196 are connected to a positive source of operating potential illustrated as +6 volts. If a signal is applied from the latch Nth by way of the line 102 to the emitter electrode of the transistor 196 this transistor becomes conductive and the signal is applied through the level shifting network 198 to the base electrode of the transistor 192 and the transistor 192 becomes conductive and through the ringing effect of the transformer 190 a 155 kilohertz signal is applied to the final latch 90 (as shown in FIG. 8) by way of the line 86 as an input to the final latch circuit. Alternatively if a 155 kilohertz signal is applied from the shaping network 104 (as shown in FIG. 8) by way of the line 106 to the emitter electrode of the transistor 194 the transistor 194 becomes conductive and the 155 kilohertz signal is applied by way of the level shifting network 198 to the base electrode of the transistor 192 making the transistor conductive and the 155 kilohertz signal is reproduced across the output terminal 86 and applied as an input signal to the final latch circuit 88 (as shown in FIG. 8). It is seen therefore that the detector 78 applies operating potential to the OR gate 84 as long as the detector 78 is receiving an input signal from the low pass filter circuit 74. The OR gate 84 in turn produces an output signal on the line 86 as long as the OR circuit is receiving an input signal on one of the line 102 or the line 106.

In reference to FIG. 8 the shaping networks 96 and 104 which are part of the logic unit 6 are standard shaping circuits which are well known in the art. These circuits produce a square wave type signal at their outputs in response to a signal of a substantially sinusoidal nature being applied to their input terminals. The N stage counter 54 is a serial type counter which is well known in the art and therefore needs no detailed description. Such counters are described in detail in "Arithmetic Operations in Digital Computers," Ch. 7, by R. K. Richards; Van Nostrand Publishing Company; 1955.

Figure 13:
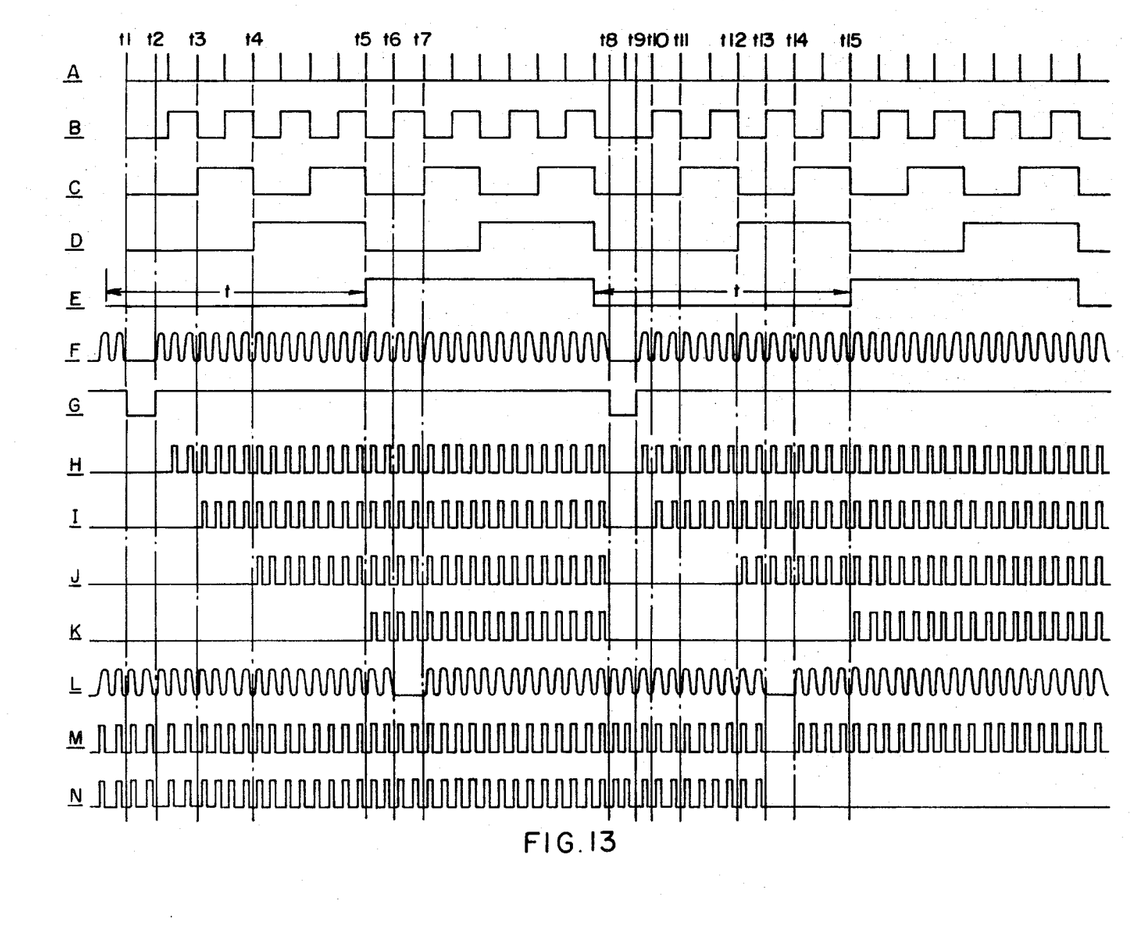
FIG. 13 is a waveform relationship illustration helpful in the understanding of FIG. 8.

In reference to FIG. 8 the operation of the logic unit 6 will now be explained in conjunction with the wave form relationship illustrations of FIG. 13 which show the waveforms present in the logic unit 6. The operation of the logic unit 6 is first to be explained for the situation in which the markers A and B are sensed at time intervals which are within the proper time limit, which is indicative of the vehicle traveling within a specified safe velocity. The operation of the logic unit 6 is then to be described for the condition in which the marker B is sensed prior to the Nth latch receiving a binary one signal at its control terminal from the Nth flip-flop in the counter, which is indicative of the vehicle traveling at higher than a safe velocity for a given portion of the track. As was previously stated the operation of the logic unit 6 is to be described with the N stage counter operating as a four stage counter.

The pulse generator 56 applies count pulses (as shown by waveform A FIG. 13) to the input terminal of flip-flop 1 of N stage counter 54. The waveform relationship of the flip-flops flip-flop 1 through flip-flop 4 are shown by the waveforms B through E respectively of FIG. 13. Consider that at a time prior to the time t1 (as shown in FIG. 13) signal devices 10 and 12 each are generating output signals as they are not sensing markers A or B (as shown by waves F and L, respectively, FIG. 13). The final latch 88 has been initially energized by the closure of the switch 92 applying a positive potential to its control terminal. Since the signal device 12 is not sensing the marker B the signal device 12 is providing an output signal (wave shape L FIG. 13) to the wave shaping network 104 which in turn is providing an input signal to the OR gate 84 by way of the line 106. The OR gate 84 therefore is providing an output control signal on the line 86 (wave shape M FIG. 13) to the input of the final latch 88. The final latch 88 therefore is providing an output speed monitoring signal on the line 90 (wave shape N FIG. 13) to the brake control unit 8 informing the brake control unit 8 that the vehicle is traveling within an allowed speed, and the brake control unit 8 therefore does not apply brakes to the vehicle. At a time t1 the signal device 10 senses an A marker and an output signal is no longer generated by the signal device 10 (wave shape F FIG. 13). The shaping network 96 in turn provides no output signal, and the detector 58 therefore in response to there being no signal applied to its input terminal generates a reset pulse for the N stage counter (wave shape G FIG. 13). At a time t2 the signal device 10 no longer senses a marker A and the signal device 10 therefore provides an output signal to the shaping network 96, which in turn provides at its output a square wave which is applied to the input of the first latch 62. The first clock pulse (wave shape A FIG. 13) applied to the counter 54 after the time t2 sets the flip-flop 1 to the binary one state (wave shape B FIG. 13). Latch 1 therefore has a square wave signal applied to its input and a binary one signal applied to its control terminal and the latch 1 therefore produces a square wave output at its output terminal (wave shape H FIG. 13) for application to the input of latch 2. At time t3 flip-flop 2 is set to the binary one state (wave shape C FIG. 13). Latch 2 has the square wave input from latch 1 applied to its input at this time and it in turn provides a square wave signal at its output terminal (wave shape I FIG. 13). At a time t4 flip-flop 3 is set to the binary one state (wave shape D, FIG. 3) and latch 3 at this time has the binary one signal from flip-flop 3 applied to its control terminal and as was stated before has a square wave signal applied to its input from latch 2 and in response to these signals, latch 3 at this time provides a square wave signal at its output (wave shape J FIG. 13). At a time t5 flip-flop 4 is set to the binary one state (wave shape E FIG. 13). Since latch 4 has a square wave applied to its input from the output of latch 3, latch 4 at this time provides a square wave output signal at its output (wave shape K FIG. 13). The latches 1 through 4 continue to provide square wave signals at their outputs independent of the state of the flip-flop which is connected to its control terminal since all the latches are receiving square wave signals to their inputs and their feedback networks are providing operating potential for the latch. This condition persists until the signal device 10 again senses a marker A.

It is to be remembered that when the flip-flop 4 is set to the binary one state this is the completion of the time interval t which is used to determine if the vehicle is operating at a safe velocity. Since latch 4 is providing a square wave signal at its output at this time this signal is applied to one input of the OR gate 84 by way of the line 102. The OR gate at this time is also receiving a square wave signal on line 106 from shaping network 104 as the signal device 12 has not yet sensed a B marker (wave shape L, FIG. 13) which is indicative of the vehicle traveling within a safe speed limit. The OR gate therefore continues to provide a square wave control signal at its output terminal (wave shape M FIG. 13) and this in turn is applied to the input of the final latch 88 which in turn continues to provide a square wave speed monitoring signal to the brake control unit (wave shape N, FIG. 13) informing the brake control unit that the vehicle is traveling at a safe speed. At a time t6 the signal device 12 senses the marker B (wave shape L, FIG. 13) and the signal device 12 no longer provides an output signal, and shaping network 104 therefore provides no input signal by way of the line 106 to the OR gate 84. Latch 4 however (wave shape K FIG. 13) is providing an output signal at this time so OR gate 84 continues to provide an output control signal to the final latch 88 which in turn continues to apply a speed monitoring signal to the brake control unit. This is so because the sensor B was sensed at a time later than the completion of the time t.

The operation of the circuit is now to be described for an overspeed condition. At a time t8 the signal device 10 again senses a marker A and a reset signal is generated by the detector 58 (wave shape G FIG. 13) and the counter is once again reset. At a time t9 the signal device 10 no longer senses a marker A and once again provides an output signal to the shaping network 96 which in turn provides output signals to the detector 58 and the first latch 62. At a time t10 which is the first clock pulse after the counter being reset (wave shape A FIG. 13) the flip-flop 1 is set to the binary one state (wave shape B FIG. 13) and at this same time latch 1 provides an output signal at its output terminal as it is receiving a binary one signal at its control terminal from flip-flop 1 and is receiving a square wave signal at its input terminal from shaping network 96. Latch 1 in turn provides a square wave signal to the input of latch 2. At time t11 flip-flop 2 is set to the binary one state (wave shape C FIG. 13) and latch 2 therefore provides a square wave signal at its output to the input of latch 3 as latch 2 has a binary one signal from flip-flop 2 applied to its control terminal and has a square wave signal applied to its input terminal from latch 1. At a time t12 flip-flop 3 is set to the binary one state (wave shape D FIG. 13). Latch 3 therefore provides a square wave signal at its output to the input of latch 4 as it is receiving a binary one signal at its control terminal from flip-flop 3 and is receiving a square wave signal at its input from latch 2. At a time t13 signal device 12 senses a marker B, and signal device 12 therefore no longer provides an output signal on line 108 to shaping network 104 which in turn no longer provides a square wave on line 106 to the input of OR gate 84 (wave shape L FIG. 13). At this time latch 4 is not providing an output signal as flip-flop 4 has not been set to the binary one state and is therefore not providing a binary one signal to the control terminal of latch 4. OR gate 84 therefore does not have a square wave signal applied to either of its inputs and it therefore does not provide a square wave control signal at its output terminal (wave shape M FIG. 13). The final latch 88 in turn does not have a square wave signal applied to its input terminal and it no longer provides an output speed monitoring signal to the brake control unit 8 (wave shape N, FIG. 13) and the brake control unit 8 in response to the absence of an input speed monitoring signal applies the brakes to the vehicle. This is the sensing of an overspeed condition since the marker B was sensed prior to the flip-flop 4 being set to the binary one state or in other words prior to the completion of the time t. Referring briefly to FIG. 7 this is the condition in which the marker B is sensed at the time B' prior to the time C which is an unsafe condition. Returning to FIG. 8, at a time t14 the signal device 12 no longer senses the marker B and the signal device 12 provides an output signal on line 108 to shaping network 104 which in turn provides a square wave signal to the first input of OR gate 84 (wave shape L FIG. 13). OR gate 84 therefore provides an output control signal on line 86 to final latch 88 (wave shape M FIG. 4). Final latch 88 however does not provide an output speed monitoring signal as it has no power applied to its control terminal 82 from the positive voltage source +V as the switch 92 is open and the brakes therefore remain applied to the vehicle 2. The vehicle 2 is not permitted to move until the switch 92 is once again closed at a time when the final latch 88 is receiving an input control signal from the OR gate 84. At a time t15 the flip-flop 4 is once again set to the binary one state (wave shape E FIG. 13). This is indicative of the time $t$ being completed. The latch 4 at this time provides an output signal at its output terminal to the OR gate 84 as the latch 4 is receiving a binary one signal at its control terminal from the flip-flop 4, and is also receiving an input signal as the latch 3 is providing a square wave signal at its output. The OR gate 84 therefore provides a square wave control signal at its output terminal (wave shape M FIG. 13), however the final latch does not provide an output speed monitoring signal as it is receiving no operating potential as its control terminal 82 as the switch 92 is still open. Once the switch 92 is closed concurrent with a signal being applied to the input of the final latch 88, the final latch 88 is again made operational and the vehicle may continue on its path of travel to the station.

It may be seen that if the N stage counter counts at too low a rate a vehicle appears to be traveling at too great a velocity and the final latch no longer provides an input signal to the brake control unit 8 and the vehicle is stopped, as was explained in reference to FIG. 7. There is a problem in many counter circuits that a counter also may count at too high a rate, that is instead of dividing by two for each stage, one stage may divide by one and the counter may count at twice its normal rate which would be an unsafe condition. The low pass filter 74 and detector circuit 78 are provided in case such a situation occurs. The output of the Nth stage of the N stage counter is provided to the low pass filter 74 which is tuned to the normal frequency of a signal from the Nth stage of the N stage counter. If the counter counts at a rate higher than this predetermined output frequency the low pass filter 74 no longer provides an output signal on line 76 to the detector 78 and the output of the detector 78 on the line 80 drops to zero volts. Since zero volts is applied to the power terminal of the OR gate 84, the OR gate 84 in turn is made inoperative which in turn disables the final latch 88 and the brakes are applied to the vehicle as the brake control unit no longer receives an input speed monitoring signal from the final latch 88.

In summary a system has been described in which a vehicle travels between first and second stations according to a predetermined speed profile. Along the roadway between the stations there are a plurality of markers A and a plurality of marker B and the vehicle as it travels between the stations alternately senses the markers A and the markers B, and if an interval of time $t$ elapses subsequent to the sensing of a marker A but prior to the sensing of a marker B the vehicle is determined to be traveling at a safe velocity. If however a marker A is sensed and subsequent to that a marker B is sensed at a time prior to the time interval $t$ elapsing the vehicle is determined to be traveling at a velocity greater than a safe velocity and the vehicle is brought to a stop. An N-stage counter provides the timing for the system and various other logic components are operatively connected with the counter and the signal sensing devices to monitor the speed of the vehicle as it travels along the path.

We claim:

1. In a control system for a vehicle moving along a path, the combination of:
    a multi-stage counter, which counts in response to provided periodic input pulses;
    first and second signal means each having an output at which first and second signals are provided, respectively;
    third means having signal inputs from said counter and said first signal means respectively for providing a third signal at an output of said third means in response to said first signal means continuously providing said first signal to said third means concurrent with said counter providing to said third means successive signals indicative of said counter counting in proper sequence to a predetermined count level in response to the provision of said periodic input pulses; and
    means responsive to one of said second and third signals being continuously provided during a given interval of time for producing a vehicle movement control signal.

2. The combination claimed in claim 1 with means for resetting said counter in response to said first signal means no longer providing said first signal.

3. The combination claimed in claim 1 with said first and second signal means each including a signal source and a signal sensor for sensing signals transmitted by said signal source.

4. The combination claimed in claim 3 with means for blocking the transmission of signals from said signal source to said signal sensor.

5. A vehicle control system comprising in combination:
    an N-stage counter, where N is an integer, which counts in response to provided periodic input pulses;
    first and second signal means each having an output at which first and second signals are provided respectively;
    means operative with said counter and said first signal means for providing a third signal in response to said first signal means continuously providing said first signal during the time interval said counter counts at least $2^{n-1}$ of said periodic input pulses in proper sequence;
    means responsive to one of said second or third signals being provided for producing a vehicle control signal;
    means for preventing the production of said vehicle control signal in response to said counter counting at a rate greater than a given rate; and
    means for resetting said counter in response to said first signal means no longer providing said first signal.

6. The combination claimed in claim 5, with said counter comprising an up-counter; and
    said means operative with said counter and said first signal means providing said third signal in response to said first signal means continuously providing said first signal during the time interval said counter counts up to at least a count of $2^{n-1}$ in proper sequence.

7. The combination claimed in claim 5 with said counter comprising a down-counter; and said means operative with said counter and said first signal means providing said third signal in response to said first signal means continuously providing said first signal during the time interval said counter counts down from a count of $2^{n-1}$ to a count of $2^{(n-1)}-1$ in proper sequence.

8. In a control system for a vehicle traveling along a path between two stations, and operative with a plurality of control markers disposed along said path at predetermined intervals, said control system sensing said markers for detecting an overspeed condition of said vehicle, the combination comprising:

signal means for sensing said plurality of markers as said vehicle travels along said path;

a multi-stage counter which counts in response to provided periodic count pulses;

control means having signal inputs from said counter and said signal means for providing a vehicle control signal at the output of said control means in response to said signal means providing a signal to said control means indicative of not sensing first predetermined ones of said plurality of markers concurrent with said counter providing to said control means successive signals indicative of said counter counting in proper sequence to a predetermined count level; and means for detecting said overspeed condition in response to said signal means sensing second predetermined ones of said plurality of markers prior to said control means providing said vehicle control signal.

9. In a control system for a vehicle traveling along a path between first and second stations, said path having a first plurality of markers disposed along said path at predetermined intervals and a second plurality of markers disposed along said path relative to said first plurality of markers, and operative with said vehicle for sensing said markers and for detecting an overspeed condition of said vehicle, the combination comprising:

first signal means for providing a first signal in response to not sensing one of said first plurality of markers and for not providing said first signal in response to sensing one of said first plurality of markers;

second signal means for providing a second signal in response to not sensing one of said second plurality of markers and for not providing said second signal in response to sensing one of said second plurality of markers;

a multi-stage counter operative with a source of periodic pulses for counting the periodic pulses;

third means having signal inputs from said counter and said first signal means respectively for providing a third signal at an output in response to said first signal means continuously providing said first signal to said third means concurrent with said counter providing to said third means successive signals indicative of said counter counting in proper sequence to at least a predetermined count in response to the provision of said periodic pulses;

means responsive to one of said second and third signals being continuously provided for producing a vehicle control signal; and means for detecting said overspeed condition in response to said vehicle control signal not being continuously as said vehicle travels from said first station to said second station.

10. In a control system for a vehicle moving along a path, the combination of:

a multi-stage counter, which counts in response to provided periodic input pulses;

first and second signal means each having an output at which first and second signals are provided, respectively;

means operative with said counter and said first signal means for providing a third signal in response to said first signal means continuously providing said first signal during the time required for said counter to count to a predetermined count level in response to the provision of said periodic input pulses;

means responsive to one of said second and third signals being provided for producing a vehicle movement control signal; and means for preventing the production of said vehicle control signal in response to said counter counting at a rate greater than a given rate.

11. In a control system for a vehicle traveling along a path between first and second stations, said path having a first plurality of markers disposed along said path at predetermined intervals and a second plurality of markers disposed along said path relative to said first plurality of markers, and operative with said vehicle for sensing said markers and for detecting an overspeed condition of said vehicle, the combination comprising:

first signal means for providing a first signal in response to not sensing one of said first plurality of markers and for not providing said first signal in response to sensing one of said first plurality of markers;

second signal means for providing a second signal in response to not sensing one of said second plurality of markers and for not providing said second signal in response to sensing one of said second plurality of markers;

a multi-stage counter operative with a source of periodic pulses for counting the periodic pulses;

means operative with said counter and said first signal means for providing a third signal in response to said first signal means continuously providing said first signal during the time required for said counter to count to at least a predetermined count in response to said periodic pulses;

means responsive to one of said second and third signals being provided for producing a vehicle control signal;

means for preventing the production of said vehicle control signal in response to said counter counting at a rate greater than a given rate; and means for detecting said overspeed condition in response to said vehicle control signal not being continuously produced as said vehicle travels from said first station to said second station.

12. The combination claimed in claim 11 with means for resetting said counter in response to said first signal not being provided.

13. In a control system for a vehicle traveling along a path between first and second stations, said path having a first plurality of markers disposed along said path at predetermined intervals and a second plurality of markers disposed along said path relative to said first plurality of markers, and operative with said vehicle for sensing said markers and for detecting an overspeed condition of said vehicle, the combination comprising:

first signal means for providing a first signal in response to not sensing, one of said first plurality of markers and for not providing said first signal in response to sensing one of said first plurality of markers;

second signal means for providing a second signal in response to not sensing one of said second plurality of markers and for not providing said second signal in response to sensing one of said second plurality of markers;

said first signal means including a first signal source and a first signal sensor aligned to sense said first signal from said first signal source, and said second signal means including a second signal source and a second signal sensor aligned to sense said second signal from said second signal source, and said first plurality of markers being aligned relative to said path and said first signal means, as said vehicle travels along said path, to block the sensing of said first signal by said first signal sensor whenever said first signal means passes adjacent to one of said first plurality of markers, and said second plurality of markers being aligned relative to said path and said second signal means, as said vehicle travels along said path, to block the sensing of said second signal by said second sensor whenever said second signal means passes adjacent to one of said second plurality of markers;

a multi-stage counter operative with a source of periodic pulses for counting the periodic pulses;

means operative with said counter and said first signal means for providing a third signal in response to said first signal means continuously providing said first signal during the time required for said counter to count to at least a predetermined count in response to said periodic pulses;

means responsive to one of said second and third signals being provided for producing a vehicle control signal; and means for detecting said overspeed condition in response to said vehicle control signal not being continuously produced as said vehicle travels from said first station to said second station.

14. The combination claimed in claim 13 with said first and second signal sources each transmitting radio frequency modulated infrared energy signals, with said first and second signals sensors each including means for detecting radio frequency signals.

15. The combination claimed in claim 13 with said first and second signal sources each transmitting magnetic energy at a radio frequency rate, and said first and second signal sensors each including means for detecting said radio frequency rate.

16. In a control system for a vehicle traveling along a path between two stations, said path having a first plurality of markers disposed along said path at predetermined intervals, and a second plurality of markers disposed along said path relative to said first plurality of markers, and operative with said vehicle for detecting an overspeed condition of said vehicle, the combination comprising:

a first signal means for providing a first signal in response to not sensing one of said first plurality of markers, and for not providing said first signal in response to sensing one of said first plurality of markers;

a second signal means for providing a second signal in response to not sensing one of said second plurality of markers, and for not providing said second signal in response to sensing one of said second plurality of markers;

an N-stage counter, where N is an integer, which counts in response to provided periodic input pulses;

means for resetting said N-stage counter in response to said first signal means no longer providing said first signal;

means operative with said N stage counter and said first signal means for providing a third signal in response to said first signal means continuously providing said first signal during the time interval said counter counts at least $2^{n-1}$ of said periodic input pulses in proper sequence;

means responsive to one of said second or third signals being provided for producing a vehicle control signal;

means for preventing the production of said vehicle control signal in response to said counter counting at a rate greater than a given rate;

means for detecting said overspeed condition in response to said vehicle control signal not being continuously produced as said vehicle travels along said path; and means for stopping said vehicle in response to the detection of said overspeed condition.

17. The combination claimed in claim 16 with said counter comprising an up-counter; and said means operative with said N stage counter and said first signal means providing said third signal in response to said first signal means continuously providing said first signal during the time interval said counter counts up to at least a count of $2^{n-1}$ in proper sequence.

18. The combination claimed in claim 16 with said counter comprising a down-counter; and said means operative with said N stage counter and said first signal means providing said third signal in response to said first signal means continuously providing said first signal during the time interval said counter counts down from a count of $2^{n-1}$ to a count of $2^{(n-1)}-1$ in proper sequence.

19. A method of controlling a vehicle traveling along a travel path between two stations, and operative with a first plurality of control markers disposed along said path at predetermined intervals, and a second plurality of control markers disposed along said path relative to said first plurality of markers, for sensing an overspeed condition of said vehicle, comprising the steps of:

sensing said first plurality of control markers as said vehicle travels along said travel path;

sensing said second plurality of control markers as said vehicle travels along said travel path;

counting provided periodic pulses;

providing a first signal in response to not sensing one of said first plurality of control markers during the time required for counting a predetermined number of said periodic pulses;

providing a vehicle control signal in response to one of not sensing one of said second plurality of control markers and the providing of said first signal;

preventing the provision of said vehicle control signal in response to the counting of said periodic pulses at greater than a given rate; and detecting said overspeed condition in response to said vehicle control signal not being continuously provided as said vehicle travels along said travel path.

20. A method of controlling a vehicle along a travel path, comprising the steps of:

counting provided periodic pulses;

providing first and second signals, which signals may be interrupted at predetermined positions along the travel path;

providing a third signal in response to the uninterrupted provision of said first signal during the time required to count at least a predetermined number of said periodic pulses;

producing a vehicle control signal in response to one of the provisions of said second and third signals;

preventing the production of said vehicle control signal in response to the counting of said periodic pulses at greater than a given rate; and stopping said vehicle in response to said vehicle control signal not being continuously provided.

* * * * *